(12) United States Patent
Goyal et al.

(10) Patent No.: US 8,669,720 B2
(45) Date of Patent: Mar. 11, 2014

(54) METHOD AND APPARATUS FOR A SWITCH HAVING A LIGHT PIPE FOR COMBINED LED DISPLAY AND LIGHT LEVEL SENSING

(75) Inventors: Rahul Goyal, Tyrone, GA (US); Oscar Neundorfer, Senoia, GA (US); James Fair, Fayetteville, GA (US); Ahmed Elgayyar, Senoia, GA (US)

(73) Assignee: Cooper Technologies Company, Houston, TX (US)

( * ) Notice: Subject to any disclaimer, the term of this patent is extended or adjusted under 35 U.S.C. 154(b) by 268 days.

(21) Appl. No.: 13/073,818

(22) Filed: Mar. 28, 2011

(65) Prior Publication Data

US 2012/0248990 A1 Oct. 4, 2012

(51) Int. Cl.
*H05B 41/36* (2006.01)

(52) U.S. Cl.
USPC .............................. 315/307; 315/291; 315/308

(58) Field of Classification Search
USPC ........... 315/291, 307, 308, 209 R, 86, 88, 89, 315/90, 129, 130, 160, 161, 210, 224–226, 315/209 T, 292–299, 362
See application file for complete search history.

(56) References Cited

U.S. PATENT DOCUMENTS

| | | | | |
|---|---|---|---|---|
| 7,688,005 | B2* | 3/2010 | Reid | 315/307 |
| 2010/0052574 | A1* | 3/2010 | Blakeley et al. | 315/307 |
| 2010/0096993 | A1* | 4/2010 | Ashdown et al. | 315/113 |
| 2010/0294915 | A1* | 11/2010 | Williams et al. | 250/206.1 |

* cited by examiner

*Primary Examiner* — Douglas W Owens
*Assistant Examiner* — Christopher Lo
(74) *Attorney, Agent, or Firm* — King & Spalding LLP (57) ABSTRACT

An electrical wiring device includes a manually adjustable switch, a light emitting diode (LED), a light level sensor, and a microcontroller. The wiring device also optionally includes an occupancy sensor. Light level is sensed through a light pipe and light is emitted by the LED through the same light pipe. When the manually adjustable switch is positioned to energize a load, the LED is deactivated and ambient light level is sensed by light sensors through the light pipe. The ambient light level is compared to a minimum ambient light level to determine if the load will be energized. Alternatively, the LED is deactivated and the ambient light level is sensed through the light pipe when the switch is positioned to de-energize the load. This ambient light level is stored and compared to the minimum ambient light level at a time when the switch is later positioned to energize the load.

18 Claims, 6 Drawing Sheets

METHOD AND APPARATUS FOR A SWITCH HAVING A LIGHT PIPE FOR COMBINED LED DISPLAY AND LIGHT LEVEL SENSING

TECHNICAL FIELD

The present invention relates generally to electrical wiring devices and more particularly, to a wiring device having a dual-purpose light pipe capable of being used for emitting light and light level sensing.

BACKGROUND

Conventional electrical switch devices that are capable of detecting ambient light levels include a pair of light pipes or a light pipe and an ambient light detection window. One light pipe is used to transmit light emitted by a light emitting diode (LED). The LED typically emits light to designate when power is being supplied to a load electrically coupled to the switch. In some embodiments, the LED also emits light at less than full power even when power is not being supplied to the load, so that the switch can be located in dark conditions. The second light pipe or light emission window is needed to detect ambient light levels in an area adjacent to the electrical switch.

Due to technological advances, changes to local and national codes, and consumer preferences modern electrical switches need to have more features and additional capabilities. Examples of these features include, occupancy sensing, night lights, ambient light level detection, dimming, dimmer level notification, as well as the numerous types of manually adjustable electrical switches themselves. Individually, the use of one of these features is not problematic. However, as more and more of these features are combined, the amount of space to provide for these features on the faceplate of the switch is increasingly restricted. The ability to combine one or more features or share components without limiting their effectiveness would provide increased flexibility in the creation of electrical switches.

SUMMARY

An electrical switch that includes an light emitting diode (LED) and a light sensor that share and operate through the same light pipe is shown and described herein. In one exemplary embodiment, an electrical wiring device can include a faceplate and a housing coupled to the faceplate. One or more terminals can be positioned within the housing. One or more light emitting sources can be electrically coupled to one or more of the terminals. In addition, a light sensor can be electrically coupled to one or more of the terminals and positioned adjacent to the light emitting source. The wiring device can also include a light pipe positioned about the light emitting source and the light sensor that can act as a passageway for the transmission of light from the light emitting source to the faceplate and can receive ambient light from the area near but outside of the wiring device and near to the faceplate and can act a passageway for the transmission of that ambient light to the light sensor.

In another exemplary embodiment, an electrical switch can include a faceplate that includes a manually adjustable switch. The switch can also include a housing coupled to the faceplate and one or more terminals disposed within the housing. A microcontroller can be electrically connected to one or more of the terminals and positioned within the housing. One or more light emitting sources can be electrically connected to one or more of the terminals. In addition, a light sensor can be electrically connected to one or more of the terminals and in communication with the microcontroller. The wiring device can also include a light pipe positioned about the light emitting source and the light sensor that can act as a passageway for the transmission of light from the light emitting source to the faceplate and can receive ambient light from the area near but outside of the wiring device and near to the faceplate and can act a passageway for the transmission of that ambient light to the light sensor.

In yet another exemplary embodiment, a method for detecting ambient light with an electrical switch can include the step of adjusting light intensity of a light emitting source before a light sensor measures the ambient light near the device. Ambient light levels near the device can then be measured through the light pipe of the electrical wiring device. The intensity of light emitted by the light emitting source can then be changed in response to the ambient light levels measured by the sensor.

In another exemplary embodiment, a method for detecting ambient light can include the step of receiving a signal at an electrical switch to energize a load. The LED can be turned off to prevent the LED from emitting light through the light pipe. A level of ambient light can be detected with a light sensor at the switch by receiving ambient light through the light pipe. The detected level of ambient light can be compared to a minimum level of ambient light and a determination whether to energize the load can be made based on that comparison.

These and other inventive concepts will be discussed herein below. The description hereinabove is not intended to be limiting in any manner and is simply a brief overview of some of the novel features of the present disclosure.

BRIEF DESCRIPTION OF THE DRAWINGS

The foregoing and other features and aspects of the invention are best understood with reference to the following description of certain exemplary embodiments, when read in conjunction with the accompanying drawings, wherein.

The drawings illustrate only exemplary embodiments of the invention and are therefore not to be considered limiting of its scope, as the invention may admit to other equally effective embodiments.

BRIEF DESCRIPTION OF EXEMPLARY EMBODIMENTS

The present invention is directed to an occupancy sensor switch that includes a light pipe that both emits light generated by an LED and receives and measures ambient light from an area adjacent to the occupancy sensor switch. Although the description of exemplary embodiments is provided below in conjunction with the occupancy sensor switch, alternate embodiments of the invention are applicable to other types of electrical wiring devices that both emit LED light and receive ambient light for detection purposes including, but not limited to, receptacles, switches, and any other electrical wiring device known to people having ordinary skill in the art. The invention is best understood by reading the following description of non-limiting, exemplary embodiments with reference to the attached drawings, wherein like parts of each of the figures are identified by like reference characters, and which are briefly described as follows.

Figure 1:
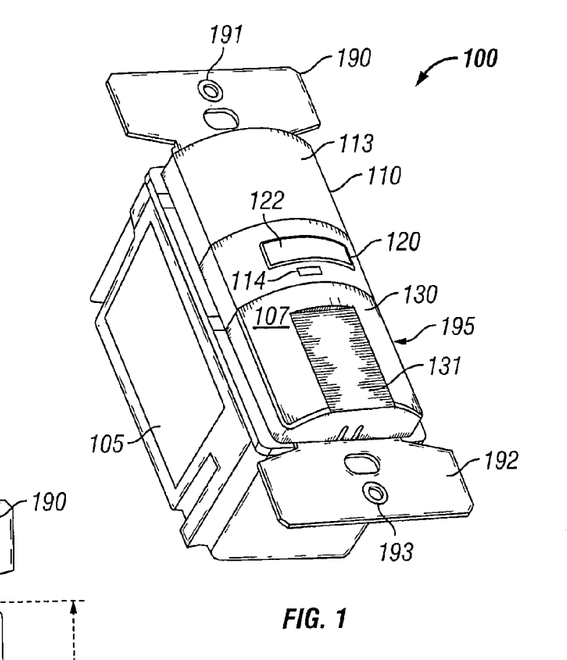
FIG. 1 is a perspective view of an occupancy sensor switch in accordance with an exemplary embodiment.
Figure 2:
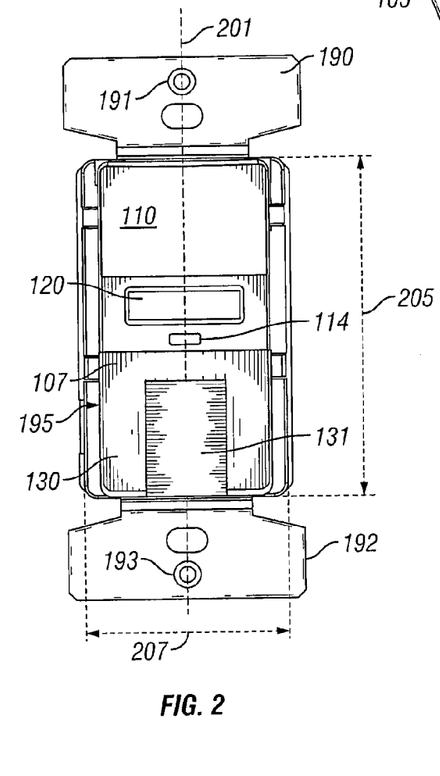
FIG. 2 is a front elevation view of the occupancy sensor switch of FIG. 1 in accordance with an exemplary embodiment.

FIGS. 1 and 2 are views of an in-wall occupancy sensor switch 100 in accordance with an exemplary embodiment of the present invention. Referring to FIGS. 1 and 2, the exemplary in-wall occupancy sensor switch 100 has a rectangular or substantially rectangular shape and includes an upper coupling band 190, a lower coupling band 192, a housing 105, and a faceplate 107. While the exemplary occupancy sensor switch 100 is described as having a rectangular shape, in alternative embodiments, the switch 100 is capable of being configured in any other geometric or non-geometric shape. The faceplate 107 has a length 205 and a width 207.

The upper coupling band 190 and the lower coupling band 192 are integrally formed with one-another with a portion disposed along the perimeter of the faceplate 107 and partially disposed between the housing 105 and the faceplate 107. In an alternative embodiment, the upper coupling band 190 and the lower coupling band 192 are formed separately and individually coupled between the housing 105 and the faceplate 107. The upper coupling band 190 and the lower coupling band 192 extend lengthwise out from the faceplate 107 and collectively extend beyond the length 205 of the faceplate 107 in both directions. The upper coupling band 190 includes an aperture 191 and the lower coupling band 192 includes an aperture 193. These apertures 191 and 193 are used to couple the in-wall occupancy sensor switch 100 to a wall box (not shown) and are configured to receive a screw (not shown) or other fastening device known to people having ordinary skill in the art therethrough. The exemplary upper and lower coupling bands 190, 192 are fabricated using a metal, such as steel. However, in alternative embodiments the bands 190, 192 are capable of being fabricated using other materials known to people having ordinary skill in the art.

In one exemplary embodiment, the housing 105 is coupled to at least one of the upper and lower coupling bands 190, 192, and the faceplate 107. The exemplary housing 105 has a substantially rectangular shape. In alternative embodiments, the housing 105 capable of being formed in other geometric or non-geometric shapes. In certain exemplary embodiments, the housing 105 includes electrical components. Some of these electrical components are shown and described with reference to FIGS. 3A-B herein below. Exemplary electrical components include electrical contacts, for electrically coupling the occupancy sensor switch 100 to building wires (not shown) and to load wires (not shown) that are electrically coupled to an associated load (not shown). The exemplary housing 105 is dimensioned to fit within the wall box. In certain exemplary embodiments, the housing 105 is fabricated using a non-conductive material, such as material. However, the housing 105 is capable of being fabricated using other materials known to those having ordinary skill in the art according to other exemplary embodiments.

In one exemplary embodiment, the faceplate 107 is coupled to at least one of the upper and lower coupling bands 190, 192, and the housing 105 and remains visible to an end-user once the occupancy sensor switch 100 is installed within the wall box. The exemplary faceplate 107 has a substantially rectangular shape. In alternative embodiments, the faceplate 107 is capable of being formed in other geometric or non-geometric shapes. In one exemplary embodiment, the faceplate 107 has a profile that is substantially similar to the profile of the housing 105 and is disposed over the housing 105. The faceplate 107 includes an occupancy sensor window 110, a night light 120, and a manually operable switch 195. In other exemplary embodiments, the night light 120 is optional. According to one exemplary embodiment, the night light 120 is disposed adjacent the occupancy sensor window 110 and the manually operable switch 195, such as, for example, being positioned between the occupancy sensor window 110 and the manually operable switch 195. In one exemplary embodiment, the occupancy sensor window 110 is positioned along the top portion of the faceplate 107, and the manually operable switch 195 is positioned along the bottom portion of the faceplate 107. In one exemplary embodiment, the occupancy sensor window is a Fresnel lens 113 that is positioned on a portion of the in-wall occupancy sensor switch 100. Although the positioning for the occupancy sensor window 110, the night light 120, and the manually operable switch 195 has been provided in accordance with one of the exemplary embodiments, other exemplary embodiments having alternative positioning for one or all of the components is within the scope and spirit of this disclosure.

In some exemplary embodiments, the in-wall occupancy sensor switch 100 includes a load status/light level sensing 114. The load status/light level sensing window 114 is located adjacent to the night light 120. Alternatively, the load status/light level sensing window 114 is capable of being positioned anywhere on the occupancy sensor switch 100 so long as the load status/light level sensing window 114 is visible to an end-user once the in-wall occupancy sensor switch 100 is installed within the wall box. The load status/light level sensing window 114 is capable of receiving a light pipe or light pipe cap discussed in greater detail with regard to FIGS. 3A-B below.

In versions where the exemplary switch 100 includes a night light 120, the night light 120 includes one or more light emitting sources, such as LEDs (not shown), or LED packages. Although LEDs are described in the exemplary embodiment, other light sources known to people having ordinary skill in the art including, but not limited to, organic light emitting diodes ("OLEDs") and liquid crystal display ("LCD") screens, are used in alternative exemplary embodiments without departing from the scope and spirit of the exemplary embodiment. In certain exemplary embodiments, the night light 120 also optionally includes a lens 122 positioned over the LEDs or LED packages. The night light LEDs emit substantially white light having a color temperature between 2500 and 5000 degrees Kelvin. However, in alternative exemplary embodiments, the night light 120 emits any color of light at various intensities of that color. The lens 122 is fabricated using an optically transmissive or clear material. In certain exemplary embodiments, the lens 122 provides environmental protection while transmitting light from the LEDs.

In certain exemplary embodiments, the lens 122 is a push-button lens that is used to turn on and off the night light 120 and/or dim the night light 120. The exemplary push-button lens is substantially rectangular; however, other geometric or non-geometric shapes for the lens are capable without departing from the scope and spirit of this disclosure. In certain exemplary embodiments, when the night light 120 turns on, the LEDs emit light through the lens 122. When the night light 120 is dimmed, the intensity of the light emitted from the LEDs through the lens 122 is varied or the number of LEDs that are on is varied according to manufacturing desires. For example, the light intensity emitted from the night light 120 is varied by increasing or decreasing the current supplied to the LEDs. In another example, if the night light 120 includes ten LEDs, the number of LEDs that emit light can be increasingly or decreasingly varied from one LED to ten LEDs or ten LEDs to one LED to produce a dimming effect.

In this exemplary embodiment, the lens 122 in pushed in and released to turn on and off the night light 120. Once the night light 120 is on, the lens 122 is pushed in and held in to achieve dimming of the night light 120. For example, once the night light 120 is turned on, the night light 120 emits light at its maximum intensity. The lens 122 is pushed in and held in to decrease the light intensity emitted from the night light 120 until the desired intensity is reached, at which time the end-user releases the lens 122. If the end-user desires to increase the intensity of the light emitted from the night light 120, the lens 122 is again pushed in and held in until the desired intensity is reached. In another embodiment, the night light 120 operation is the same, except that once the night light 120 is turned on, the night light 120 emits light at a pre-set intensity, which is set by the end-user and is between the maximum intensity and the minimum intensity. For example, the pre-set intensity is the intensity of the light that the night light 120 emitted immediately before being previously turned off. Thus, according to one exemplary embodiments, the lens 122 of the night light 120 is used to control the operation of the night light 120. In an alternate exemplary embodiment, the lens 122 is repeated tapped to increase or decrease the intensity of the light emitted through the night light 120.

Figure 3A:
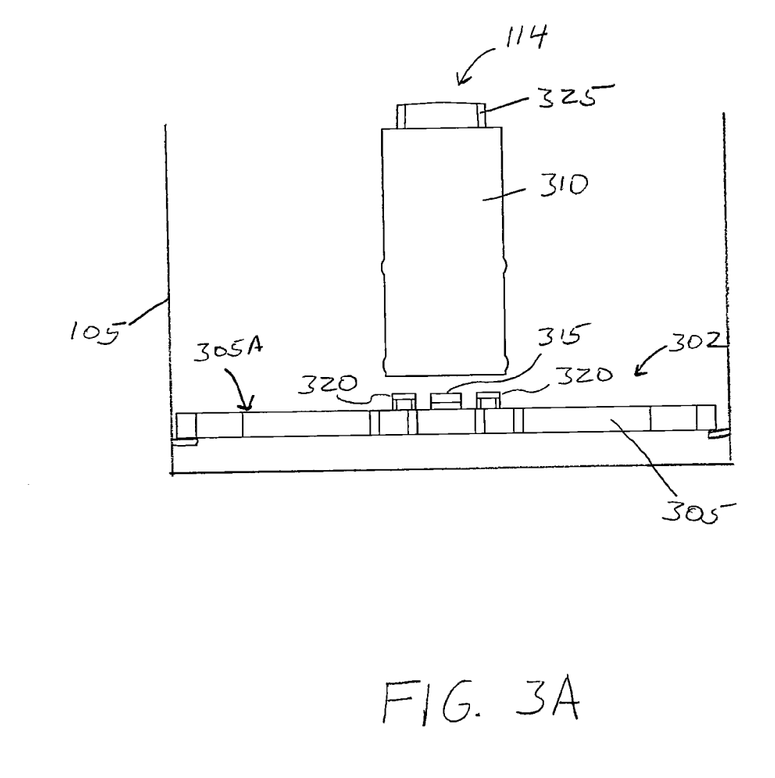
FIGS. 3A and 3B are a partial exploded views of certain internal components of the occupancy sensor switch of FIG. 1 in accordance with an exemplary embodiment.
Figure 3B:
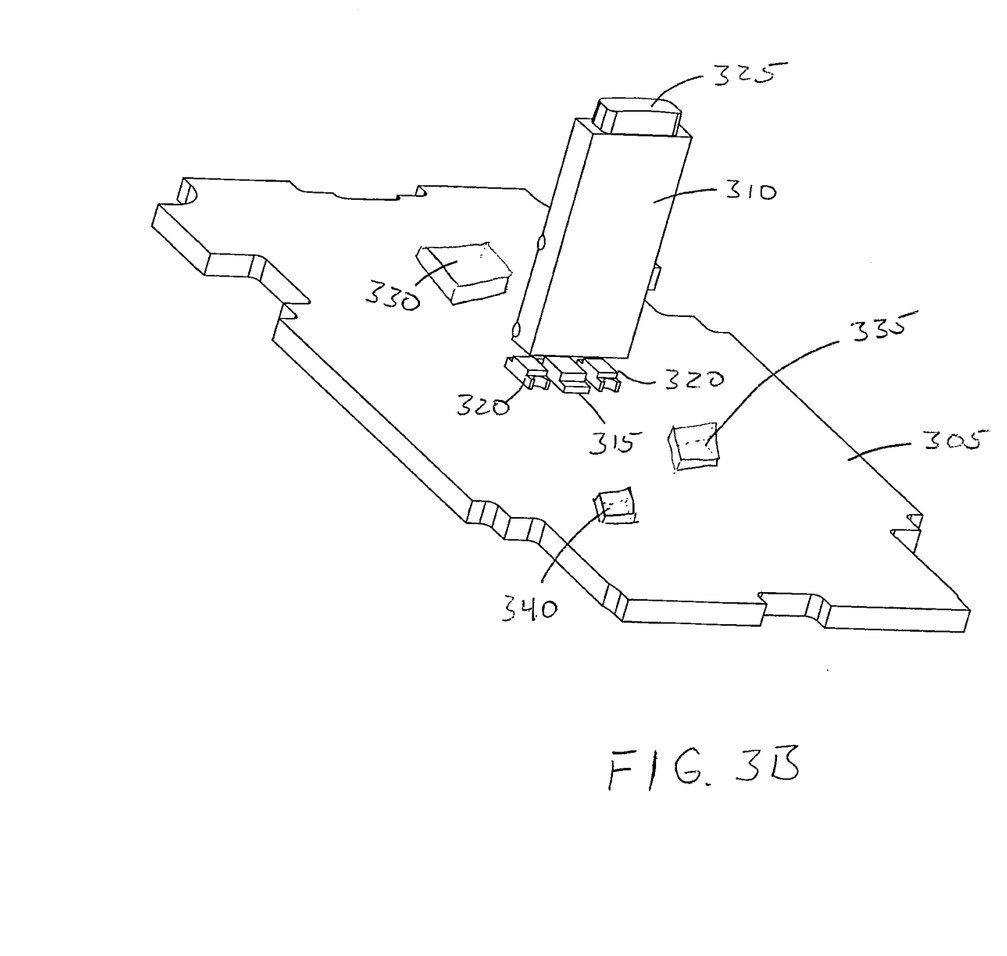

FIGS. 3A and 3B are a partial exploded views of certain internal components of the occupancy sensor switch of FIGS. 1 and 2 in accordance with an exemplary embodiment. Now referring to FIGS. 1, 2, and 3A-B, the housing 105 of the occupancy sensor switch 100 includes a printed circuit board (PCB) assembly 302 disposed generally near a bottom end of the housing 105. The PCB assembly includes one or more terminals. In one exemplary embodiment, the terminals are embodied in a printed circuit board (PCB) 305 defining a perimeter and a top surface 305A. A light emitting source such as, for example, an LED 315 is electrically coupled to the circuit board and disposed along or adjacent to the top surface 305A. Other examples of light emitting sources include, but are not limited to OLEDs and LCDs. In one exemplary embodiment, power for the LED 315 is supplied through traces (not shown) on the PCB 305. One or more light sensors 320 are electrically coupled to the PCB 305 and disposed along or adjacent the top surface 305A of the PCB 305. In one exemplary embodiment, the light sensors 320 are coupled to the PCB 305. In this exemplary embodiment, the light sensor 320 is disposed about or adjacent to the LED 315 and positioned close enough to the LED 315 so that both the light sensor 320 and the LED 315 are disposed within a light pipe 310. Exemplary light sensors 320 include a photocell, a photosensitive resistor, a photo diode and infrared (IR) sensor, and/or a phototransistor.

The LED or LED package 315 provides information to the end-user as to the load status, whether motion has been detected in the monitored area, and/or the location of the switch 100. In one exemplary embodiment, the LED 315 emits a visible constant light at or near full intensity when a load associated with the in-wall occupancy sensor switch 100 is on and emits a dimmed level of light when the load associated with the in-wall occupancy sensor switch 100 is off. Also, in certain exemplary embodiments, the LED 315 emits a momentary flashing light when motion is detected within the monitored area and emits no light when motion is not detected within the monitored area. In alternative exemplary embodiments, other methods, such as using two or more independent LEDs or LED packages, can be used to show the load status or whether motion has been detected within the monitored area. In this alternative embodiment, for example, one LED or LED package indicates the load status while the second LED or LED package indicates whether motion has been detected in the monitored area.

In certain exemplary embodiments, an optically transmissive or clear material (not shown) encapsulates at least a portion of each LED or LED package. This encapsulating material provides environmental protection while transmitting light from the LEDs. In certain exemplary embodiments, the encapsulating material includes a conformal coating, a silicone gel, a cured/curable polymer, an adhesive, or some other material known to a person of ordinary skill in the art having the benefit of the present disclosure. In certain exemplary embodiments, phosphors are coated onto or dispersed in the encapsulating material for creating a desired light color.

The light pipe 310 includes a first end with a first aperture, a second end opposite from and distal of the first with a second aperture and a channel connecting the first and second apertures such that a pathway through the light pipe 310 is created. In certain exemplary embodiments, the second aperture is covered by a light transmissive cap 325. The light transmissive cap 325 can be clear or translucent with a colored tint. The first end of the light pipe 310 is disposed along the top surface 305A. The light pipe 310 extends up from the top surface 305A of the PCB 305 such that a portion of the light transmissive cap 325 is disposed along the surface of or extends through the faceplate 107. The light pipe 310 includes an inner surface and an outer surface. The inner surface has an inner dimension large enough to receive the light sensors 320 and the LED 315 therein.

The PCB 305 also includes an occupancy sensor 330 electrically coupled to the PCB 305 and disposed along the top surface 305A of the PCB 305. The occupancy sensor 330 senses occupancy through the occupancy sensor window 110 in the monitored area and sends a signal to energize a load, maintains a signal to energize the load when sensing continuing occupancy of the monitored area, and enables settings for operating the occupancy sensor 330. According to some exemplary embodiments, the occupancy sensor 330 includes one or more passive infrared ("PIR") sensors (not shown). Although the exemplary occupancy sensor 330 includes PIR sensors, in alternative embodiments, the occupancy sensor 330 includes any one or a combination of different occupancy sensing technologies including, but not limited to, PIR, ultrasonic, microwave, and microphonic technologies in other exemplary embodiments.

According to one of the exemplary embodiments, the occupancy sensor 330 using the PIR sensors to detect occupancy, passively senses the occupancy of the monitored area, generates a signal upon detecting occupancy and continues generating the signal upon sensing the continuing occupancy of the monitored area. In certain exemplary embodiments, when the occupancy sensor 330 generates the signal based upon detecting motion, the associated load is turned on (if the manually adjustable switch 195 is in a position designating that the load should be energized and if the ambient light level is below or equal to or below a minimum ambient light level). The exemplary occupancy sensor 330 utilizes a passive technology that does not send out a signal to aid in the reception of a signal. However, in certain alternative exemplary embodiments, the occupancy sensor 330 utilizes an active technology, such as ultrasonic technology, or a combination of active and passive technologies.

The use of PIR sensors for determining occupancy in a monitored area is known to people having ordinary skill in the art. In certain exemplary embodiments, the occupancy sensor 330 transmits one or more signals to the microcontroller so that the microcontroller is able to determine occupancy within a desired monitored area. In these exemplary embodiments, the occupancy sensor 330 automatically sends a signal to the microcontroller at predetermined time intervals, at random time intervals, or only when occupancy is detected. Alternatively, the microcontroller polls the occupancy sensor 330 for the occupancy detection sensor 330 to send a signal back to the microcontroller. The microcontroller is able to poll the occupancy sensor 330 automatically at predetermined time intervals or at random time intervals.

In addition, the PCB 305 includes a memory storage device 335 and a timer 340. The memory storage device 335 is electrically coupled to the PCB 305 and communicably coupled to the light sensors 320. The timer 340 is electrically coupled to the PCB 305 and disposed along the top surface 305A. The occupancy sensor 330, memory storage device 335, LED 315, light sensors 320, and timer 340 is communicably coupled to a microcontroller (not shown) disposed on the top surface 305A of the PCB 305.

Figure 4:
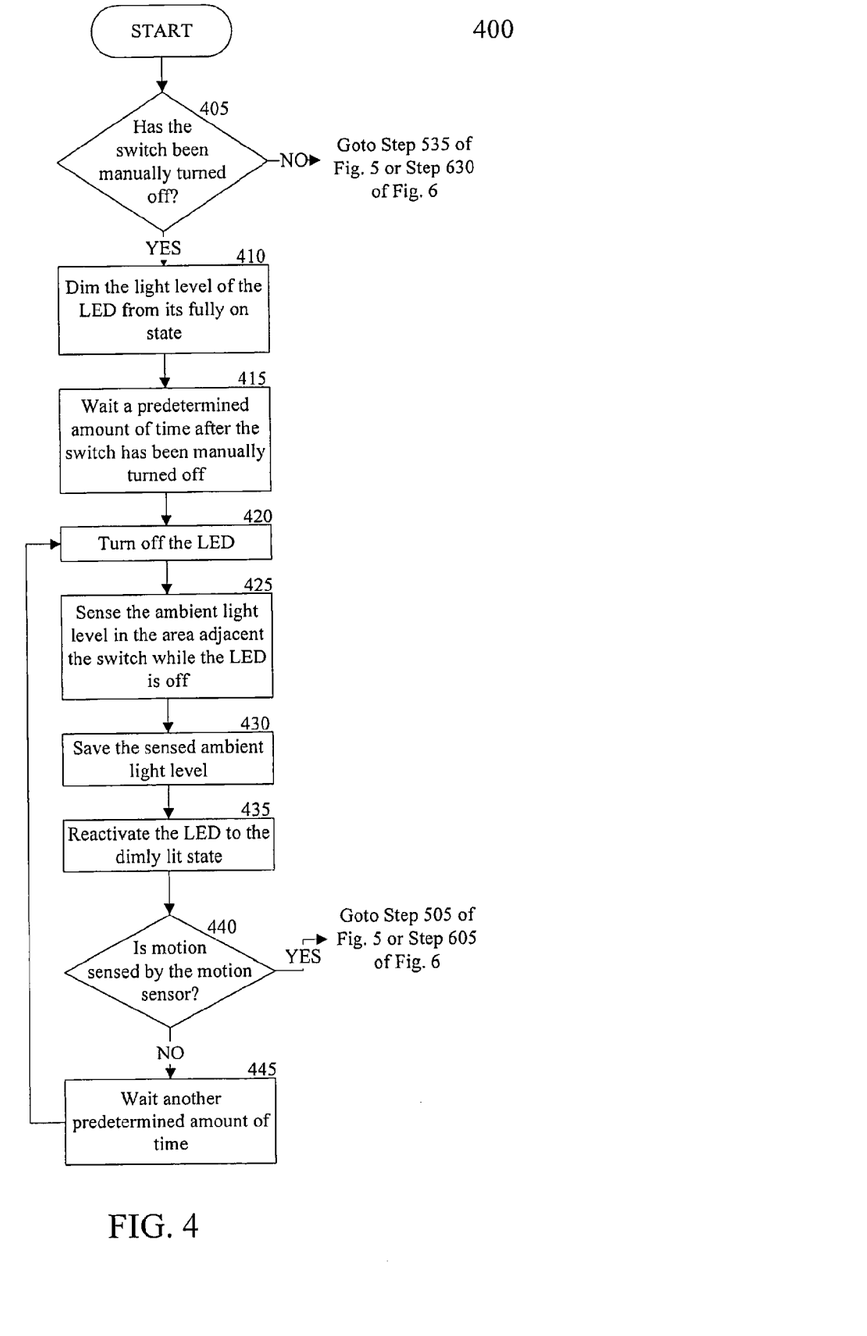
FIG. 4 is a flow chart depicting a method for determining ambient light levels through the same light pipe and the LED load indicator in accordance with an exemplary embodiment.
Figure 5:
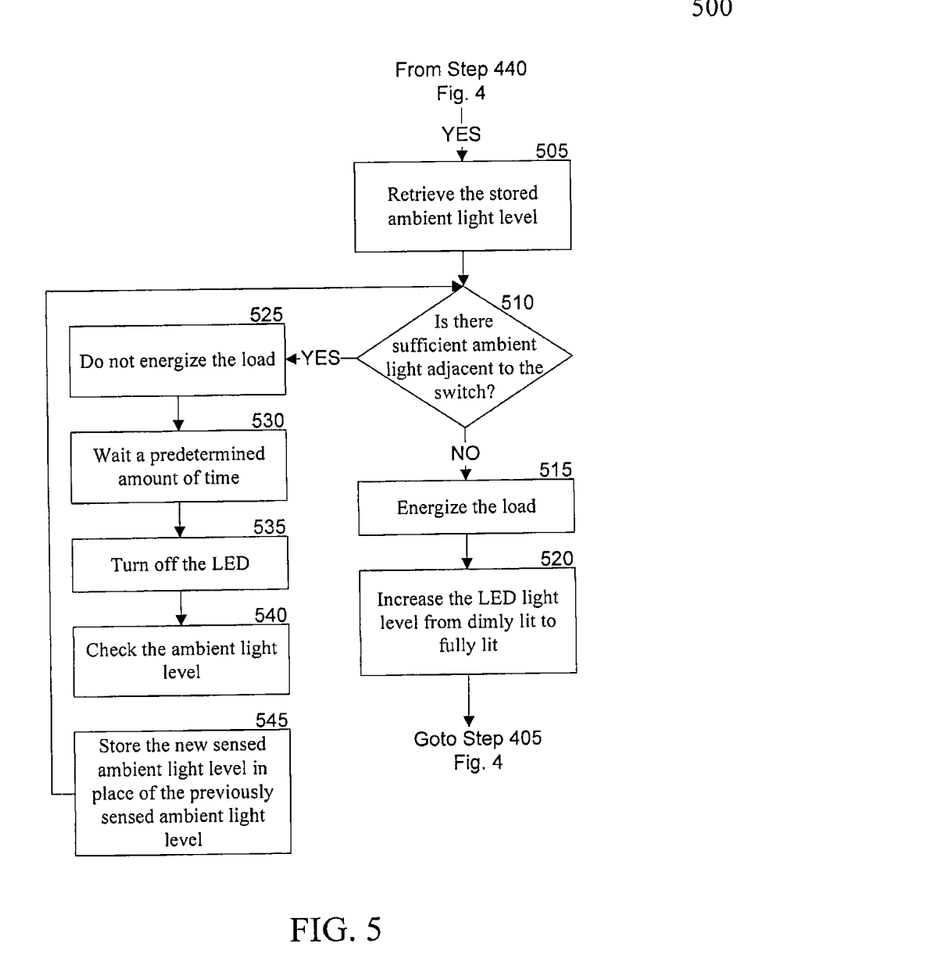
FIG. 5 is a flow chart depicting a method for determining if a load should be activated by a switch based on stored ambient light levels in accordance with an exemplary embodiment.
Figure 6:
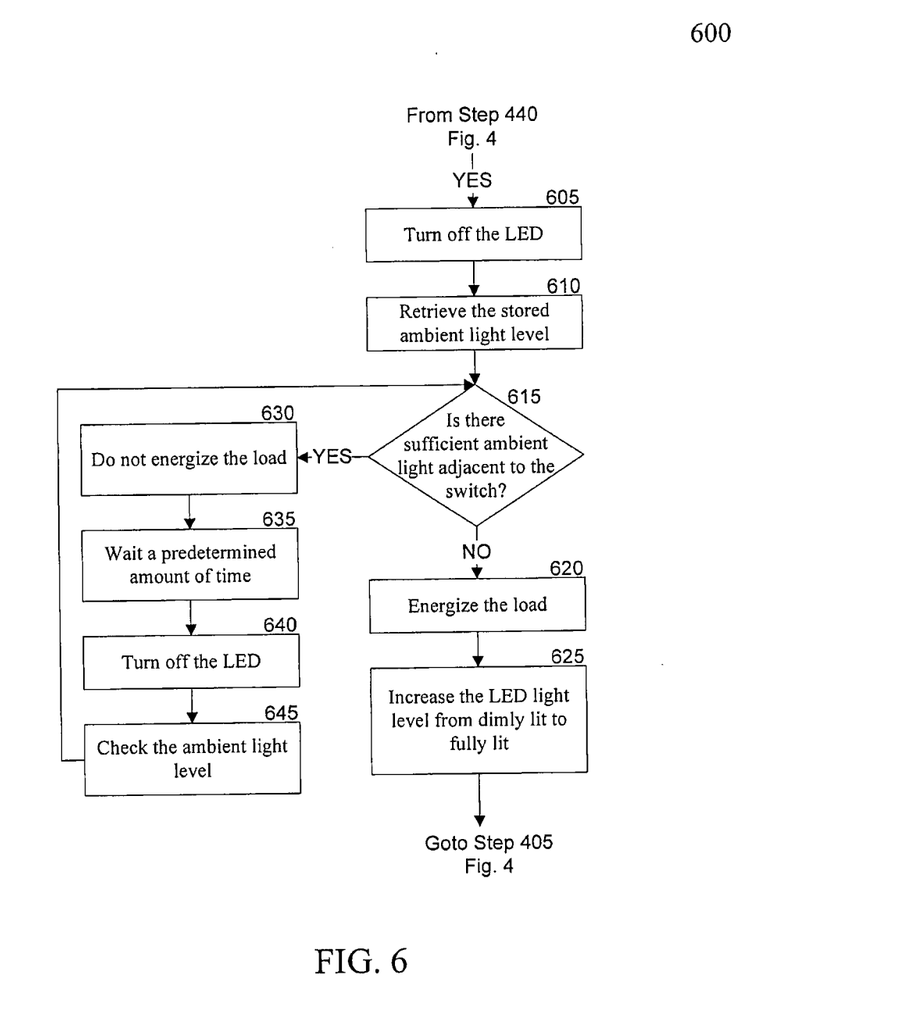
FIG. 6 is a flow chart depicting an alternative method for determining if a load should be activated by a switch based on current ambient light levels detected through the same light pipe as the output from the LED load indicator in accordance with an exemplary embodiment.

FIGS. 4-6 are flow charts depicting exemplary methods 400-600 for emitting light from the LED 315 and sensing ambient light with the light sensors 320 through the same light pipe 310 in accordance with an exemplary embodiment. The exemplary methods 400-600 are illustrative only and, in alternative embodiments, certain steps can be performed in a different order, in parallel with one another, or omitted entirely, and/or certain additional steps can be performed without departing from the scope and spirit of this disclosure. Referring now to FIGS. 1-4, the exemplary method 400 begins at the START step and proceeds to step 405 where and inquiry is conducted to determine if the power to the load has been just or recently manually turned off at the switch 100 by a user. In one exemplary embodiment, power to the load is turned on or off by depressing the push-button switch 195. The depressing of the switch can then be detected at the PCB and received by the microcontroller (not shown) which makes the determination in step 405. If the switch 195 has not been manually turned off, the "NO" branch is followed to step 535 of FIG. 5 or alternatively to step 630 of FIG. 6. Otherwise, the "YES" branch is followed to step 410.

In step 410, the light output level for the LED 315 being passed through the light pipe 310 is dimmed to a level that is less than a full emitting level. In one exemplary embodiment, the microcontroller adjusts the emitting level of the LED 315. A predetermined time is allowed to pass after the switch 195 is put into the off position in step 415. In certain exemplary embodiments, the predetermined amount of time is between 1-60 seconds and preferably about 15 seconds. In these exemplary embodiments, the timer 340 monitors the passage of time and transmits that information to the microcontroller. In step 420, the microcontroller sends a signal to turn the LED 315 off such that no more light from the LED 315 is being emitted through the light pipe 310.

Once the LED 315 is off, the light sensors 320 sense the amount of ambient light in the area adjacent the switch 100 by receiving ambient light through the same light pipe 310 through which the LED light was previously emitted in step 425. In step 430, the level of ambient light sensed by the light sensors 320 is stored. In one exemplary embodiment, the level of ambient light sensed is stored in the memory storage device 335. The LED 315 is reactivated by the microcontroller sending a signal to activate the LED 315 in step 435.

In step 440, an inquiry is conducted to determine if motion is sensed by the motion sensor 330 in the switch 100. In one exemplary embodiment, if motion is sensed by the motion sensor 330, the sensor 330 sends a signal to the microcontroller. If the motion sensor 330 does not sense motion, the "NO" branch is followed to step 445. In step 445, the switch 100 waits a second predetermined amount of time with the LED 315 continuing to emit a dimmed level of light through the light pipe 310. In one exemplary embodiment, the second predetermined amount of time is any time period in a range of 1 minute to two hours and preferably about fifteen minutes. In this exemplary embodiment, the time period calculated by the timer 340 and monitored by the microcontroller. The process then returns to step 420. Returning to step 440, if the motion sensor senses motion, the "YES" branch is followed to step 505 of FIG. 5 or alternatively step 605 of FIG. 6.

FIG. 5 is a flow chart depicting a method 500 for determining if a load should be activated by a switch based on stored ambient light levels in accordance with an exemplary embodiment. Now referring to FIGS. 1-5, the method 500 begins at step 505, where the stored ambient light level is retrieved. In one exemplary embodiment, the ambient light level is retrieved by the microcontroller from the memory storage device 335.

In step 510, an inquiry is conducted to determine if the stored ambient light level representative of the ambient light level adjacent to the switch is sufficient, such that there is not a need to energize the load. In one exemplary embodiment, determining if the ambient light level is sufficient is achieved by comparing the stored ambient light level to a predetermined and pre-stored minimum light level value. If the stored ambient light level is greater than the minimum light level value, then the load (i.e. the lights controlled by the switch 100) will not be activated. Conversely, if the stored ambient light level is less than the minimum light level value, then the load will be activated. When the stored ambient light level is equal to the minimum light level value, the load may or may not be activated based on the manufacturer's preference. Further, in alternative embodiments, the switch 100 is capable of having a potentiometer or other manual adjustment mechanism that allows the user to adjust the minimum light level value up or down. In these exemplary embodiments, the comparison of the ambient light level to the minimum light level value and the determination as to if there is sufficient ambient light is completed by the microcontroller.

If there is not sufficient ambient light adjacent to the switch 100 based on the comparison, then the "NO" branch is followed to step 515. In step 515, electricity is allowed to flow and the load is energized. The intensity of the light emitted by the LED 315 is increased from the dimly lit level to substantially full power to designate that power is flowing to the load in step 520. In one exemplary embodiment, the light emission level of the LED 315 is adjusted in step 520 by the microcontroller. The process continues to step 405 of FIG. 4.

Returning to step 510, if it is determined that there is sufficient ambient light, based on the comparison described above, the "YES" branch is followed to step 525, where the load is not energized. In step 530, the switch 100 waits a second predetermined amount of time with the LED 315 continuing to emit a dimmed level of light through the light pipe 310. In one exemplary embodiment, the second predetermined amount of time is any time period in a range of 1 minute to two hours and preferably about fifteen minutes. In this exemplary embodiment, the time period is calculated by the timer 340 and monitored by the microcontroller. In step 535, the microcontroller sends a signal to turn the LED 315 off such that no more light from the LED 315 is being emitted through the light pipe 310. Once the LED 315 is off, the light sensors 320 sense the amount of ambient light in the area adjacent the switch 100 by receiving ambient light through the same light pipe 310 through which the LED light was previously emitted in step 540. In step 545, the level of ambient light sensed by the light sensors 320 is stored and the LED 315 is reactivated by the microcontroller sending a signal to activate the LED 315 in the dimmed state. In one exemplary embodiment, the level of ambient light sensed is stored in the memory storage device 335. The process returns from step 545 to step 510 to make another determination as to whether the newly stored ambient light level is sufficient to maintain the load in the de-energized state.

FIG. 6 is a flow chart depicting an alternative method 600 for determining if a load should be activated (or energized) by a switch based on currently sensed ambient light levels in accordance with an exemplary embodiment. Now referring to FIGS. 1-4 and 6, the method 600 begins at step 505, where the microcontroller sends a signal to turn the LED 315 off such that no more light from the LED 315 is being emitted through the light pipe 310. Once the LED 315 is off, the light sensors 320 sense the amount of ambient light in the area adjacent the switch 100 by receiving ambient light through the same light pipe 310 through which the LED light was previously emitted in step 610.

In step 615, an inquiry is conducted to determine if the current ambient light level representative of the ambient light level adjacent to the switch is sufficient, such that there is not a need to energize the load. In one exemplary embodiment, determining if the ambient light level is sufficient is achieved by comparing the stored ambient light level to a predetermined and pre-stored minimum light level value. If the stored ambient light level is greater than the minimum light level value, then the load (i.e. the lights controlled by the switch 100) will not be activated. Conversely, if the stored ambient light level is less than the minimum light level value, then the load will be activated. When the stored ambient light level is equal to the minimum light level value, the load may or may not be activated based on the manufacturer's preference. Further, in alternative embodiments, the switch 100 is capable of having a potentiometer or other manual adjustment mechanism that allows the user to adjust the minimum light level value up or down. In these exemplary embodiments, the comparison of the ambient light level to the minimum light level value and the determination as to if there is sufficient ambient light is completed by the microcontroller.

If there is not sufficient ambient light adjacent to the switch 100 based on the comparison, then the "NO" branch is followed to step 620. In step 620, electricity is allowed to flow through the switch and the load is energized. The intensity of the light emitted by the LED 315 is increased from the dimly lit level to substantially full power to designate that power is flowing to the load in step 625. In one exemplary embodiment, the light emission level of the LED 315 is adjusted in step 625 by the microcontroller. The process continues to step 405 of FIG. 4.

Returning to step 615, if it is determined that there is sufficient ambient light, based on the comparison described above, the "YES" branch is followed to step 630, where the load is not energized. In step 635, the switch 100 waits a second predetermined amount of time with the LED 315 continuing to emit a dimmed level of light through the light pipe 310. In one exemplary embodiment, the second predetermined amount of time is any time period in a range of 1 minute to two hours and preferably about fifteen minutes. In this exemplary embodiment, the time period is calculated by the timer 340 and monitored by the microcontroller. In step 640, the microcontroller sends a signal to turn the LED 315 off such that no more light from the LED 315 is being emitted through the light pipe 310. Once the LED 315 is off, the light sensors 320 sense the amount of ambient light in the area adjacent the switch 100 by receiving ambient light through the same light pipe 310 through which the LED light was previously emitted in step 645. The process returns from step 645 to step 615 to make another determination as to whether the newly sensed ambient light level is sufficient to maintain the load in the de-energized state.

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. An electrical wiring device comprising:
   a faceplate;
   a housing coupled to the faceplate;
   a plurality of terminals disposed within the housing;
   at least one light emitting source electrically coupled to at least one of the plurality of terminals;
   a light sensor electrically coupled to at least one of the plurality of terminals and disposed adjacent the light emitting source; and
   a light pipe comprising:
       a channel for transmitting light, wherein the light pipe is disposed about the light emitting source and the light sensor and wherein the light pipe transmits light from the light emitting source to the faceplate and receives ambient light from an external environment outside of the wiring device and near the faceplate and transmits it to the light sensor;
       an inner surface;
       an outer surface;
       a first end disposed about the light source and comprising a first aperture; and
       a distal second end disposed adjacent the faceplate and comprising a light transmissive area;
       wherein the channel is defined by the area between the first aperture and the light transmissive area.

2. The electrical wiring device of claim 1, further comprising a microcontroller electrically coupled to at least one of the plurality of terminals and communicably coupled to the light sensor.

3. The electrical wiring device of claim 2, further comprising an occupancy sensor electrically coupled to at least one of the plurality of terminals and communicably coupled to the microcontroller.

4. The electrical wiring device of claim 1, wherein the light sensor measures an amount of ambient light received through the light pipe from the external environment near to the faceplate.

5. The electrical wiring device of claim 4, wherein the light emitting source emits a beam of light that travels through the light pipe and exits the faceplate into the external environment.

6. The electrical wiring device of claim 1, wherein the light sensor comprises one of a photocell, a photoresistor, a phototransistor, a photo diode and an infrared sensor.

7. The electrical wiring device of claim 1, further comprising a manually adjustable switch disposed on the faceplate and communicably coupled to the microcontroller, wherein the manually adjustable switch generates a signal to energize or de-energize a load.

8. The electrical wiring device of claim 1, wherein the light emitting source is a light emitting diode.

9. The electrical wiring device of claim 1, wherein the light sensor is disposed about the light emitting source.

10. The electrical wiring device of claim 1, further comprising a printed circuit board, wherein the printed circuit board comprises one or more of the plurality of terminals.

11. An electrical switch comprising:
  a faceplate comprising a manually adjustable switch;
  a housing coupled to the faceplate;
  a plurality of terminals disposed within the housing;
  a microcontroller electrically coupled to at least one of the plurality of terminals and disposed within the housing;
  at least one light emitting source electrically coupled to at least one of the plurality of terminals;
  a light sensor electrically coupled to at least one of the plurality of terminals and communicably coupled to the microcontroller; and
  a light pipe comprising:
    a channel for transmitting light, wherein the light pipe is disposed about the light emitting source and the light sensor and wherein the light pipe transmits light from the light emitting source to the faceplate and receives ambient light from an external environment outside of the wiring device and near the faceplate and transmits it to the light sensor;
    an inner surface;
    an outer surface;
    a first end disposed adjacent the printed circuit board and comprising a first aperture; and
    a distal second end disposed adjacent to the faceplate and comprising a light transmissive cap;
    wherein the channel is defined by an area between the first aperture and the light transmissive cap and wherein the area is dimensioned to receive the light emitting source and the light sensor therein.

12. The electrical wiring device of claim 11, wherein the light sensor measures an amount of ambient light from the external environment near to the faceplate, the ambient light being received through the light transmissive cap and transmitted through the channel of the light pipe to the light sensor.

13. The electrical wiring device of claim 12, wherein the light emitting source emits a beam of light that travels through the channel of the light pipe and exits the faceplate through the light transmissive cap into the external environment.

14. A method of detecting ambient light within an electrical wiring device comprising the steps of:
  adjusting a light intensity of a light emitting source before a light sensor takes an ambient light measurement;
  receiving ambient light through a light pipe of the electrical wiring device; wherein the light pipe comprises a channel for transmitting light, an inner surface, an outer surface, a first end disposed adjacent to the light emitting source and comprising a first aperture, and a distal second end disposed adjacent to an external surface of the electrical wiring device and comprising a light transmissive cap, wherein the channel is defined by an area between the first aperture and the light transmissive cap and wherein the channel is dimensioned to receive the light emitting source and the light sensor therein;
  measuring the ambient light level received through the light pipe; and
  changing the intensity of light emitted by the light emitting source in response to the measured ambient light level by the sensor.

15. A method of detecting ambient light with an electrical switch comprising the steps of:
  receiving a signal at the electrical switch to energize a load;
  turning off a light emitting diode emitting light through a light pipe at the electrical switch;
  detecting a level of ambient light adjacent to the switch with a light sensor at the switch by receiving ambient light through the light pipe, wherein the light pipe comprises a channel for transmitting the ambient light to the light sensor, and wherein the light pipe further comprises an inner surface, an outer surface, a first end disposed within the switch comprising a first aperture, and a distal second end comprising a light transmissive cap, wherein the channel is defined by an area between the first aperture and the light transmissive cap;
  comparing the level of ambient light adjacent to the switch to a minimum level of ambient light; and
  making a determination to energize the load based on the comparison of the level of ambient light adjacent to the switch to the minimum level of ambient light.

16. The method of claim 15, further comprising the step of energizing the load based on a determination that the detected level of ambient light is less than or equal to the minimum level of ambient light.

17. The method of claim 15, further comprising the step of energizing the load based on a determination that the detected level of ambient light is less than the minimum level of ambient light.

18. The method of claim 15, further comprising the step of not energizing the load based on a determination that the detected level of ambient light is greater than the minimum level of ambient light.

* * * * *